(12) United States Patent
Nishio et al.

(10) Patent No.: US 8,670,776 B2
(45) Date of Patent: *Mar. 11, 2014

(54) RADIO COMMUNICATION APPARATUS AND RADIO COMMUNICATION METHOD

(71) Applicant: Panasonic Corporation, Osaka (JP)

(72) Inventors: Akihiko Nishio, Kanagawa (JP); Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,744

(22) Filed: Jan. 3, 2013

(65) Prior Publication Data

US 2013/0121202 A1 May 16, 2013

Related U.S. Application Data

(63) Continuation of application No. 12/341,306, filed on Dec. 22, 2008, now Pat. No. 8,369,285, which is a continuation of application No. 10/540,401, filed as application No. PCT/JP03/14778 on Nov. 20, 2003, now Pat. No. 8,254,335.

(30) Foreign Application Priority Data

Dec. 26, 2002 (JP) ................................. 2002-378076

(51) Int. Cl.
*H04W 72/00* (2009.01)

(52) U.S. Cl.
USPC ..................... 455/452.1; 455/452.2; 455/453; 370/329; 370/330; 370/331; 370/332

(58) Field of Classification Search
USPC .......................... 455/452, 522, 453, 512, 513; 370/329–332
See application file for complete search history.

(56) References Cited

U.S. PATENT DOCUMENTS 5,726,978 A 3/1998 Frodigh et al.
6,130,882 A * 10/2000 Levin ............................. 370/252

(Continued)

FOREIGN PATENT DOCUMENTS

EP 1 052 821 A2 11/2000
EP 1 065 818 A1 1/2001

(Continued)

OTHER PUBLICATIONS

3GPP TSG-RAN-1 Meeting #28 bis, Espoo, Finland, Oct. 8-9, 2002, pp. 5-12.

(Continued)

*Primary Examiner* — Lester Kincaid
*Assistant Examiner* — Mehmood B Khan
(74) *Attorney, Agent, or Firm* — Seed IP Law Group PLLC

(57) ABSTRACT

A CIR measuring section measures CIRs of all blocks received and a block selection section makes a threshold decision based on the CIR measurement result and threshold information according to an amount of traffic in the own cell and neighboring cells. As a result of the threshold decision, blocks whose CIRs exceed the threshold are regarded as usable blocks. A CIR averaging section averages the CIRs of the usable blocks and a CQI generation section generates a CQI based on the CIR average value. The CQI generated and selected block numbers are reported to a base station apparatus. This allows the throughput of the own cell and neighboring cells to be improved.

6 Claims, 20 Drawing Sheets

(56) References Cited

U.S. PATENT DOCUMENTS

| | | | |
|---|---|---|---|
| 6,330,429 B1* | 12/2001 | He | 455/67.11 |
| 6,400,699 B1* | 6/2002 | Airy et al. | 370/329 |
| 6,587,510 B1* | 7/2003 | Minami et al. | 375/285 |
| 6,654,431 B1* | 11/2003 | Barton et al. | 375/346 |
| 6,721,569 B1 | 4/2004 | Hashem et al. | 455/450 |
| 6,748,222 B1 | 6/2004 | Hashem et al. | 455/453 |
| 6,836,484 B2 | 12/2004 | Suzuki | |
| 7,372,836 B2 | 5/2008 | Hwang et al. | |
| 7,471,745 B2* | 12/2008 | Anim-Appiah et al. | 375/324 |
| 2002/0147017 A1 | 10/2002 | Li et al. | |
| 2002/0159422 A1 | 10/2002 | Li et al. | |
| 2002/0163879 A1 | 11/2002 | Li et al. | |
| 2003/0060165 A1* | 3/2003 | Horisaki | 455/67.4 |
| 2003/0072395 A1* | 4/2003 | Jia et al. | 375/341 |
| 2004/0009786 A1 | 1/2004 | Terry | |
| 2004/0125743 A1* | 7/2004 | Hashem et al. | 370/208 |
| 2004/0203476 A1* | 10/2004 | Liu | 455/69 |
| 2004/0203991 A1* | 10/2004 | Chen et al. | 455/522 |
| 2005/0135320 A1* | 6/2005 | Tiedemann et al. | 370/338 |
| 2005/0289256 A1* | 12/2005 | Cudak et al. | 710/62 |
| 2006/0040697 A1* | 2/2006 | Komatsu | 455/522 |
| 2006/0056283 A1* | 3/2006 | Anikhindi et al. | 370/208 |
| 2006/0088007 A1* | 4/2006 | Jalali et al. | 370/334 |
| 2006/0089102 A1* | 4/2006 | Nishio et al. | 455/67.11 |
| 2006/0126493 A1* | 6/2006 | Hashem et al. | 370/208 |
| 2008/0317158 A1* | 12/2008 | Ketchum et al. | 375/267 |
| 2009/0104877 A1* | 4/2009 | Nishio et al. | 455/67.7 |
| 2009/0279498 A1* | 11/2009 | Li et al. | 370/329 |
| 2010/0080267 A1* | 4/2010 | Gerakoulis | 375/144 |
| 2011/0080923 A1* | 4/2011 | McCloud et al. | 370/479 |

FOREIGN PATENT DOCUMENTS

| | | | |
|---|---|---|---|
| JP | 7-322219 A | 12/1995 | |
| JP | 11-508417 A | 7/1999 | |
| JP | 11-215095 A | 8/1999 | |
| JP | 2000-224140 A | 8/2000 | |
| JP | 2000-324081 A | 11/2000 | |
| JP | 2001-103034 A | 4/2001 | |
| JP | 2001-238269 A | 8/2001 | |
| JP | 2002-217825 A | 8/2002 | |
| JP | 2002-369258 A | 12/2002 | |
| JP | 4785982 B2 | 10/2011 | |
| WO | 97/01256 A1 | 1/1997 | |
| WO | 00/36776 A1 | 6/2000 | |
| WO | 02/37872 A2 | 5/2002 | |
| WO | 02/49305 A2 | 6/2002 | |
| WO | 02/101951 A2 | 12/2002 | |

OTHER PUBLICATIONS

International Search Report, dated Mar. 9, 2004, for International Application No. PCT/JP03/14778, 2 pages.

Lucent Technologies, "Comments on frequency scheduling and joint power and rate optimization for OFDM," R1-02-1321, Agenda Item: OFDM, 3GPP TSG-WG1#29, Shanghai, China, Nov. 5-8, 2002, 4 pages.

Notice of Reason for Rejection, dated Mar. 4, 2008, for Japanese Application No. 2002-378076, 6 pages.

Notice of Reason for Rejection, dated Jul. 15, 2008, for Japanese Application No. 2002-378076, 4 pages.

Office Action, dated Aug. 18, 2010, for Japanese Application No. 2008-233711, 3 pages.

Office Action, dated Jul. 27, 2006, for Korean Application No. 10-2004-7015800, 6 pages.

Supplementary European Search Report, dated Dec. 6, 2011, for European Application No. 03774072.7, 4 pages.

* cited by examiner

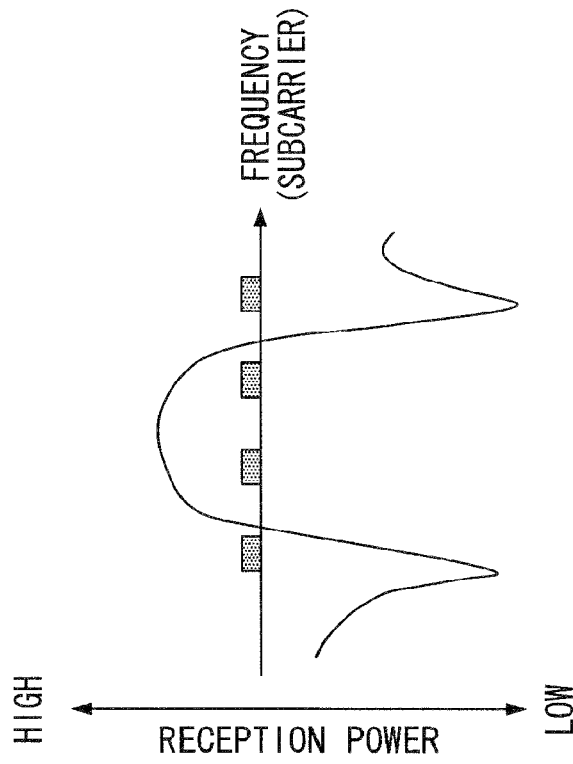
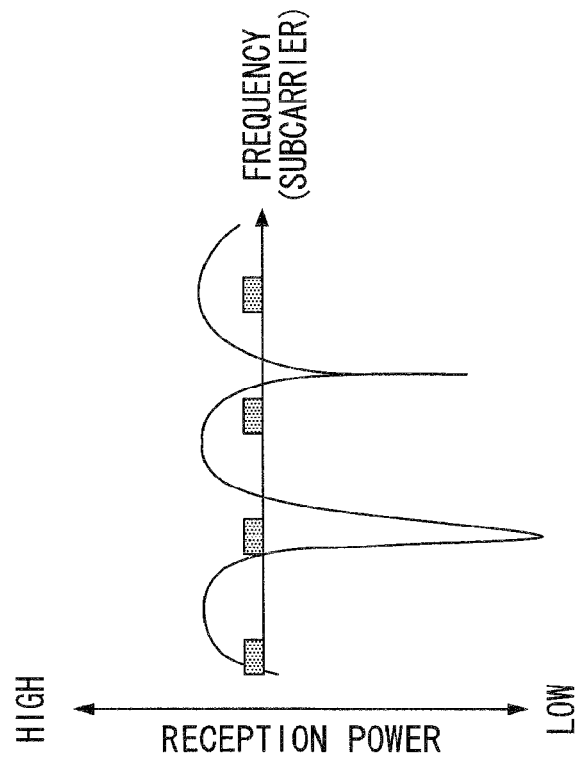
FIG.5B
FIG.5A

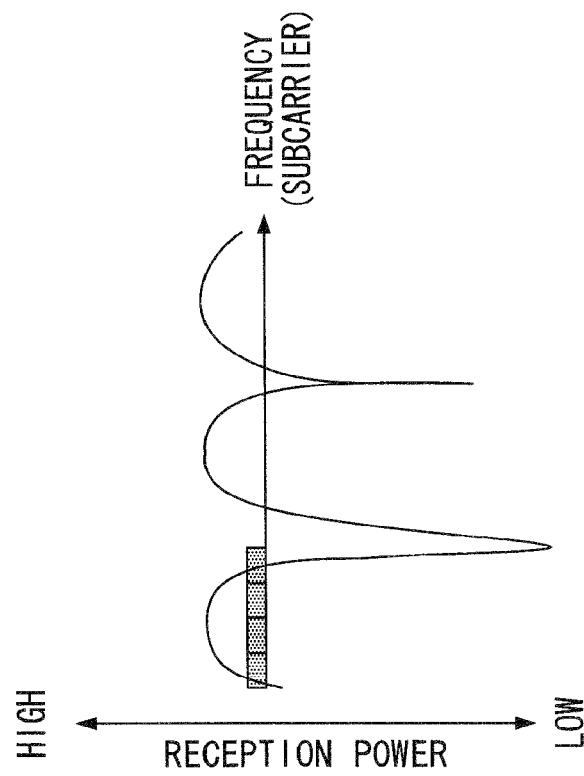
FIG.6A CASE 1
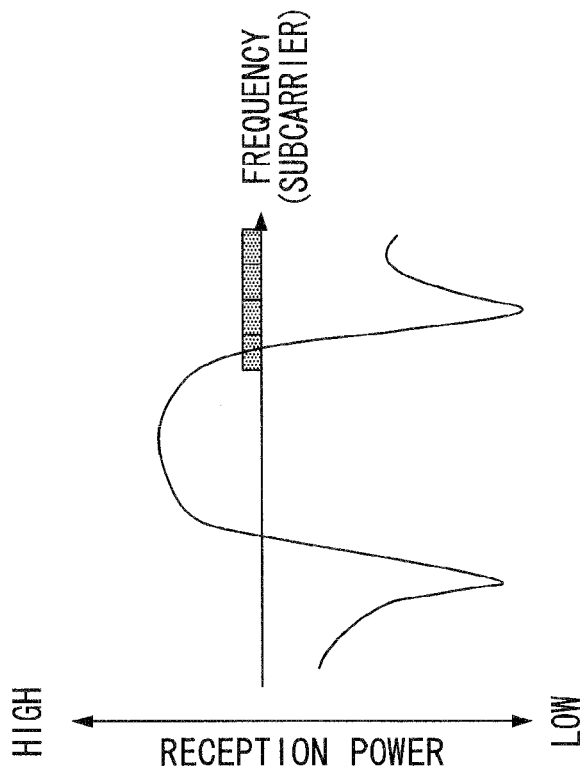
FIG.6B CASE 2 ical Field

The present invention relates to a radio communication apparatus and radio communication method in a multicarrier transmission, and is suitable for use in, for example, an OFDM (Orthogonal Frequency Division Multiplex) communication terminal apparatus.

2. Description of the Related Art

In a conventional W-CDMA (Wideband-Code Division Multiple Access) mobile communication system, a downlink high-speed packet transmission scheme (HSDPA: High Speed Downlink Packet Access) is being developed under which a high-speed, large-capacity downlink channel is shared among a plurality of communication terminal apparatuses and packet data is transmitted from a base station apparatus to a communication terminal apparatus at high speed.

Here, HSDPA in a W-CDMA system will be explained briefly. A communication terminal apparatus measures a reception CIR (Carrier to Interference Ratio) and reports information (e.g., CQI: Channel Quality Indicator) indicating a downlink channel condition to a base station apparatus based on the measured CIR. The base station apparatus determines a communication terminal apparatus to which packet data is to be sent (transmission destination apparatus) based on CQIs reported from the respective communication terminal apparatuses. This is called "scheduling." Furthermore, the base station apparatus determines according to what modulation scheme and what coding rate (MCS: Modulation and Coding Scheme) packet data to be sent to the transmission destination apparatus should be processed based on the downlink channel condition indicated by the CQI. This is called "MCS assignment." The base station apparatus sends packet data to the determined transmission destination apparatus according to the determined MCS.

As a specific example of MCS assignment, suppose a case where a fading variation as shown in FIG. 1 occurs. FIG. 1 illustrates a time variation of reception power due to fading. Suppose, the horizontal axis shows a time, the vertical axis shows reception power, and the reception power becomes a maximum at t1 and the reception power becomes a minimum at t2. It is decided that the propagation path is in a good condition at t1 and a high MCS level (e.g., 16 QAM, coding rate 3/4) is assigned. On the other hand, it is decided that the propagation path is in a poor condition at t2 and a low MCS level (e.g., QPSK, coding rate 1/4) is assigned. That is, when the propagation path is in a good condition, high-speed transmission is possible.

Therefore, if a communication terminal apparatus assigned a high MCS level is determined as the transmission destination, it is possible to send a large amount of data in a short time and thereby improve throughput of the system.

Furthermore, a conventional W-CDMA system maintains reception quality per bit by controlling transmit power, while the HSDPA can maintain reception quality per bit by controlling the MCS as described above.

The above described HSDPA is a technology based on the premise that it is used for a W-CDMA system, and the application of the HSDPA technology to an OFDM (Orthogonal Frequency Division Multiplexing) communication apparatus which is a promising next-generation communication scheme is under study. The following are examples of the HSDPA technology applied to OFDM.

Conventional Example 1

A communication terminal apparatus measures reception CIRs of all subcarriers and reports a CQI to a base station apparatus based on the measured CIRs. Based on the CQIs reported from the respective communication terminal apparatuses, the base station apparatus performs scheduling and MCS assignment and carries out transmission using all the subcarriers. Furthermore, the base station apparatus distributes subcarriers uniformly over all frequencies and send the subcarriers. Furthermore, the base station apparatus also prepares subcarriers not to be used to reduce interference with neighboring cells. When the number of users of the neighboring cells increases, it is possible to prevent a lot of interference with the neighboring cells by increasing the number of subcarriers not to be used and improve the system throughput.

FIG. 2 illustrates a frequency assignment method in conventional example 1. Here, assuming the number of users is 2, a situation in which frequencies are assigned to UE1 and UE2 is shown as an example. Suppose a frequency band used in the system is 5 MHz and the number of subcarriers is 512. In conventional example 1, as shown in FIG. 2, all subcarriers are assigned in order of UE1, UE2 and unassigned subcarrier (assigned to no target). Subcarriers assigned to no target are assigned between UE1 and UE2 sub carriers.

Conventional Example 2

In conventional example 2, a communication terminal apparatus measures reception CIRs of all subcarriers and reports CQI to a base station apparatus based on the measured reception CIRs. The base station apparatus determines a communication terminal apparatus as the transmission destination (can also be plural), MCS and subcarriers based on the CQIs reported from the respective communication terminal apparatuses.

From the next time of transmission on, the communication terminal apparatus generates a CQI based on the CIRs of the assigned subcarriers and reports this CQI to the base station apparatus. When the base station apparatus uses the same subcarriers for the communication terminal apparatus next time, it is possible to realize MCS assignment according to a more accurate CQI. FIG. 3 conceptually shows this method.

FIG. 3 conceptually shows a communication method in conventional example 2. This figure assumes a case where Node B (base station apparatus) is communicating with UE1 to 3 (communication terminal apparatus 1 to 3). First, UE1 to 3 send CQIs about all subcarriers to Node B in the initial transmission ((1) in the figure). Node B carries out scheduling based on the transmitted CQIs and starts to transmit data ((2) in the figure). For the next time transmission, UE1 to 3 transmit CQIs about assigned frequencies (subcarriers) to Node B ((3) in the figure). Node B carries out scheduling for the next time transmission and transmits data to UE3 ((4) in the figure). In this example, in (2) in the figure, suppose Node B assigns frequencies (subcarriers) to UE1 to 3 as shown in FIG. 4.

FIG. 4 illustrates a frequency assignment method in conventional example 2. Here, only parts different from FIG. 2 will be explained and assuming that the number of users is 3, a situation in which frequencies are assigned to UE1 to 3 is shown. In conventional example 2, neighboring subcarriers are collectively assigned to users and unassigned subcarriers (assigned to no target) are provided to reduce interference with neighboring cells.

However, above described conventional examples 1 and 2 have a problem that subcarriers having low reception power may be assigned. This will be explained using FIG. 5 and FIG. 6.

FIG. 5 conceptually shows reception power of subcarriers assigned in conventional example 1 at the communication terminal apparatus. Here, the state of reception power is shown as case 1 (FIG. 5A) and case 2 (FIG. 5B). As is seen from this figure, both subcarriers having high reception power (in a good propagation situation) and subcarriers having low reception power (in a bad propagation situation) are assigned.

Furthermore, FIG. 6 conceptually shows reception power of subcarriers assigned in conventional example 2 at the communication terminal apparatus. FIG. 6 also shows states of reception power similar to those in FIG. 5 as case 1 (FIG. 6A) and case 2 (FIG. 6B). According to this method, it is possible to transmit data with an MCS according to a propagation situation of subcarriers, but as shown in FIG. 6, subcarriers having low reception power (in a bad propagation situation) are assigned, resulting in a low MCS level. Especially, in the situation of case 2, all the subcarrier assigned may have low reception power.

In this way, data transmitted with subcarriers with reduced reception power cannot be decoded, retransmission of the data may be requested or data may be transmitted with a low MCS level, which causes throughput to be reduced.

Furthermore, the communication terminal apparatus may also generate CQIs for all subcarriers separately and report them to the base station apparatus, but this may increase the number of transmission bits for reports and overweigh the uplink.

Furthermore, for example, in a system of reuse 1 (frequency iteration 1) using the same frequency in neighboring cells as shown in FIG. 7, a signal transmitted by Node B#1 to a UE in the own cell becomes interference with neighboring cells (Nodes B#2 and #3). In such a system, the number of subcarriers used in the own cell determines interference with neighboring cells and a large amount of interference with neighboring cells will cause the throughput of the entire system to reduce. For this reason, it is necessary to carry out transmission with a limited number of subcarriers efficiently.

BRIEF SUMMARY

It is an object of the present invention to provide a radio communication apparatus and radio communication method that improve throughput of the own cell and neighboring cells.

The present invention attains the above described object by selecting subcarriers of high reception quality as subcarriers to be used based on a criterion determined by amounts of traffic of the own cell and neighboring cells, creating a report value indicating average reception quality of the selected subcarriers and reporting the report value created and information indicating the subcarriers to be used to the other party of communication.

BRIEF DESCRIPTION OF THE SEVERAL VIEWS OF THE DRAWINGS

FIG. 5A conceptually illustrates reception power of subcarriers assigned in conventional example 1 at a communication terminal apparatus;

FIG. 5B conceptually illustrates reception power of subcarriers assigned in conventional example 1 at the communication terminal apparatus;

FIG. 6A conceptually illustrates reception power of subcarriers assigned in conventional example 2 at the communication terminal apparatus;

FIG. 6B conceptually illustrates reception power of subcarriers assigned in conventional example 2 at the communication terminal apparatus;

DETAILED DESCRIPTION

With reference now to the attached drawings, embodiments of the present invention will be explained below.

Figure 1:
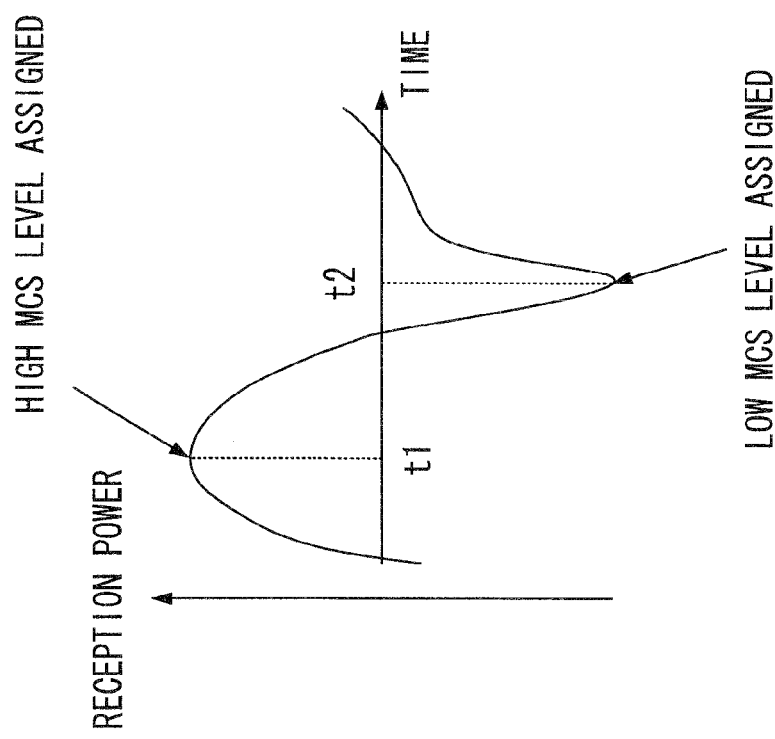
FIG. 1 illustrates a time variation of reception power due to fading.
Figure 2:
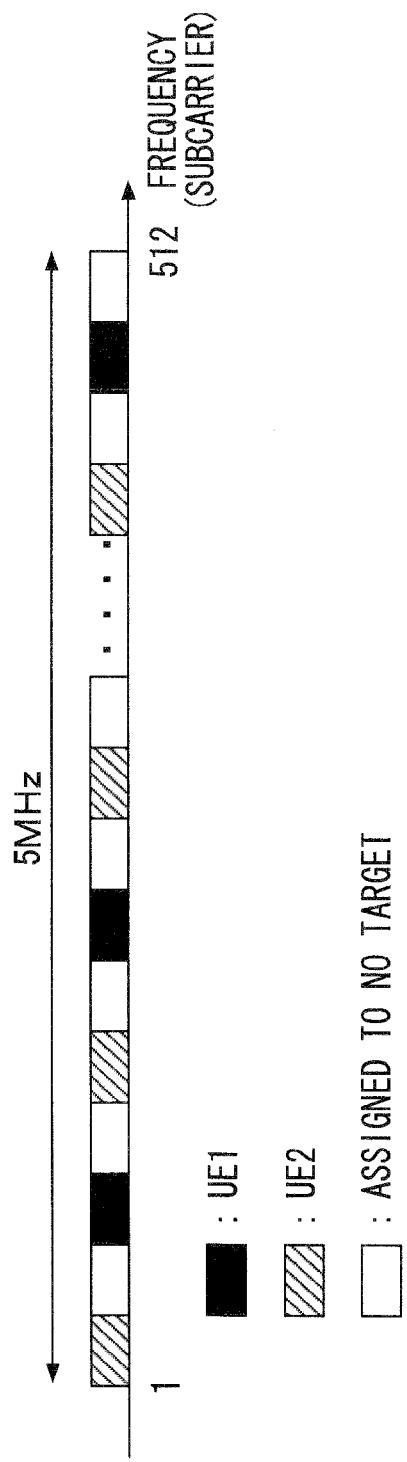
FIG. 2 illustrates a frequency assignment method in conventional example 1.
Figure 3:
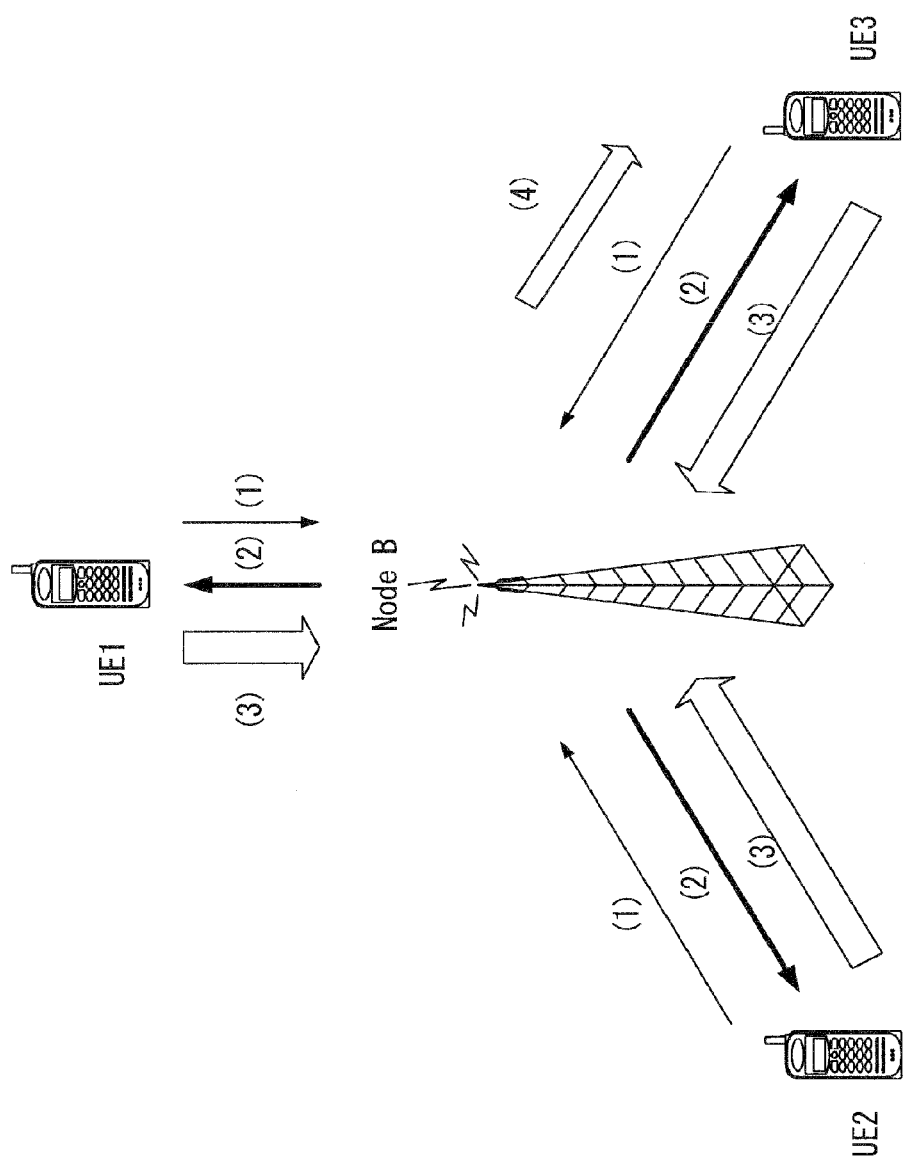
FIG. 3 conceptually illustrates a communication method in conventional example 2.
Figure 4:
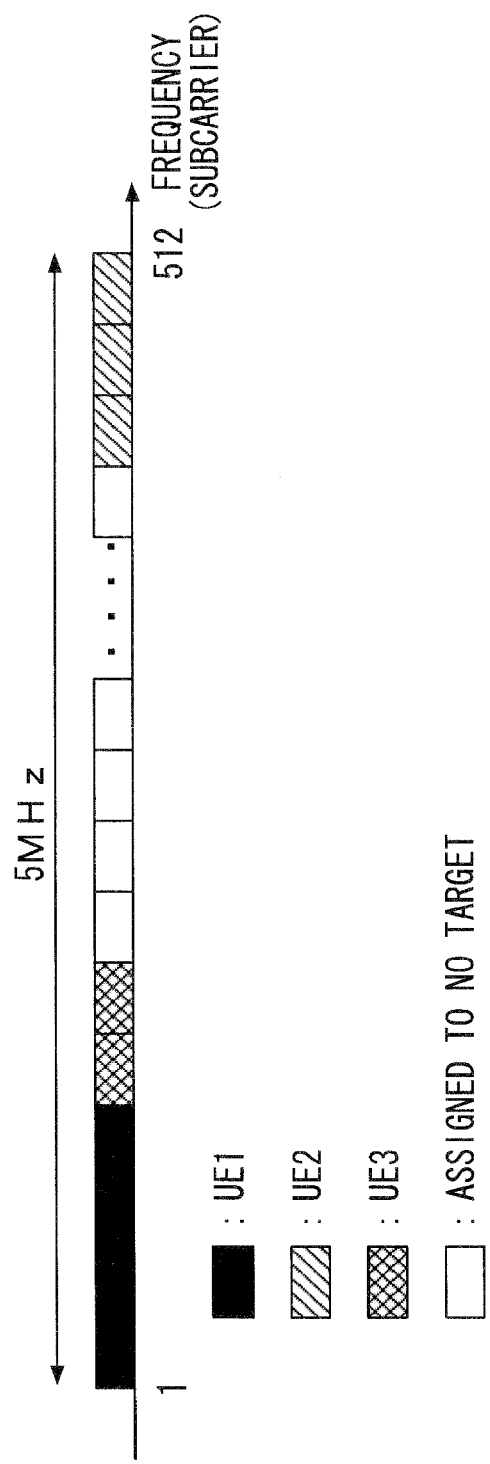
FIG. 4 illustrates a frequency assignment method in conventional example 2.
Figure 7:
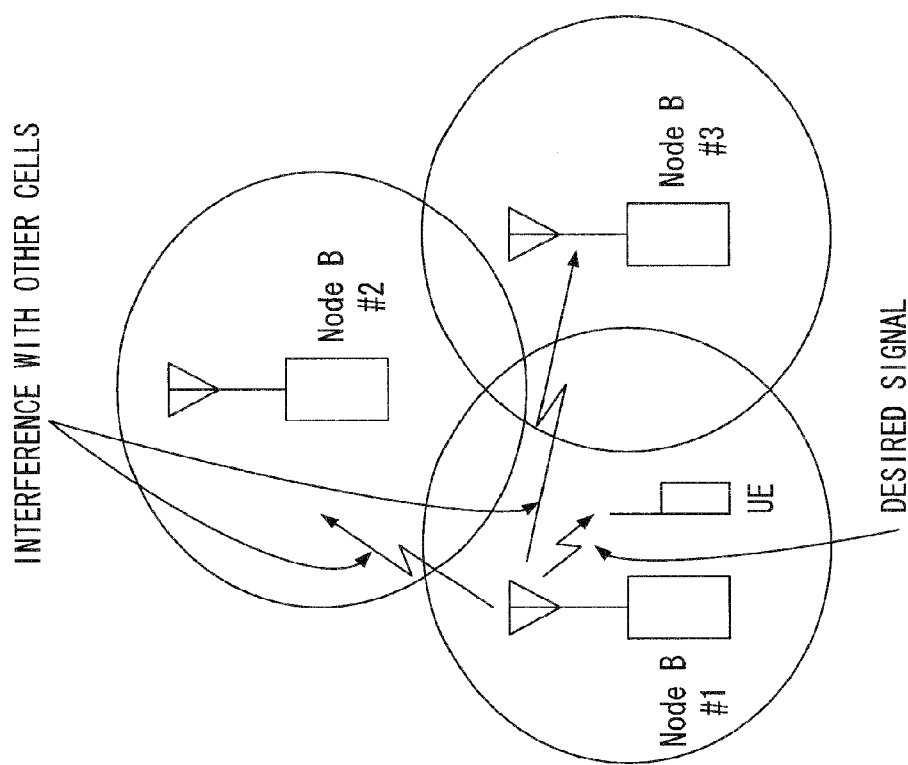
FIG. 7 illustrates a conceptual view showing a situation of interference with neighboring cells in a system of reuse 1.
Figure 8:
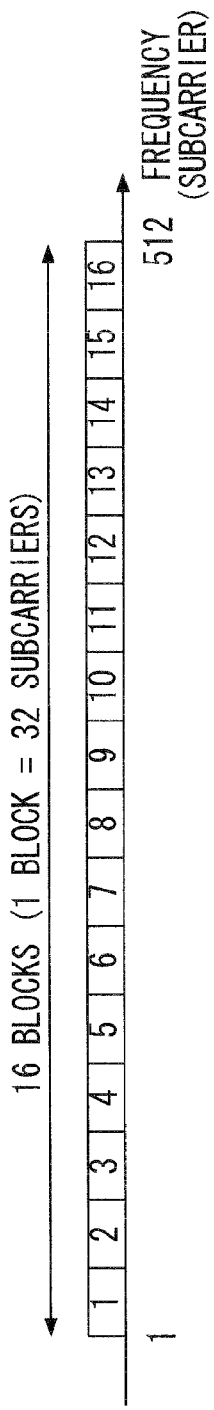
FIG. 8 is a schematic diagram conceptually illustrating subcarrier blocks.

According to embodiments of the present invention, as shown in FIG. 8, suppose assignment is performed in block units assuming that the number of subcarriers to be used is 512, one subcarrier block (hereinafter simply referred to as "block") consists of 32 subcarriers and a total of 16 blocks are used unless specified otherwise. Each block is assigned a number (block number) for identifying the block.

Embodiment 1

Figure 9:
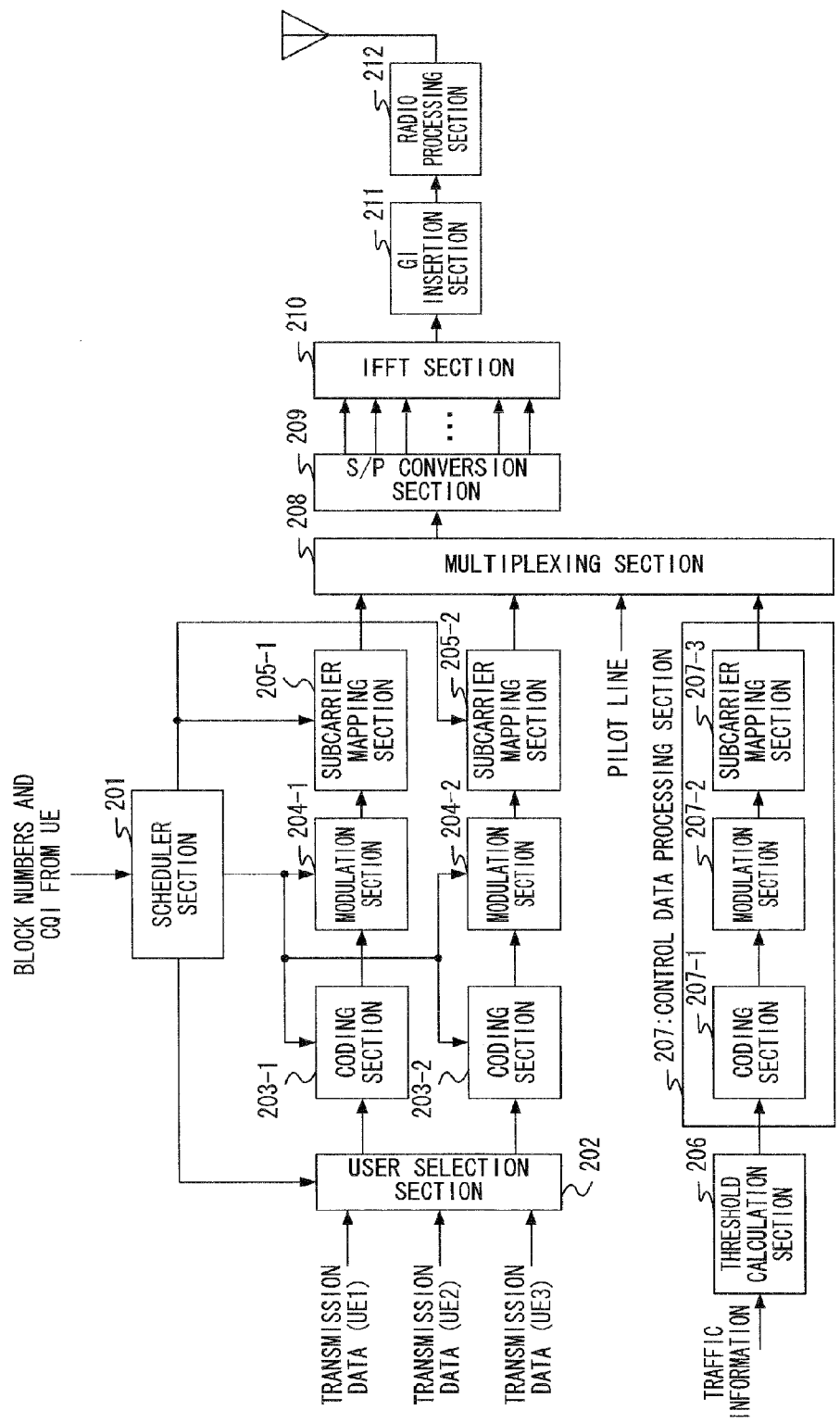
FIG. 9 is a block diagram illustrating the configuration of a transmission system of a base station apparatus according to Embodiment 1 of the present invention.

FIG. 9 is a block diagram showing the configuration of a transmission system of a base station apparatus according to Embodiment 1 of the present invention. In this figure, a scheduler section 201 determines (scheduling) to which communication terminal apparatus transmission in the next frame is carried out based on a CQI reported from each communication terminal apparatus in communication and outputs the determined scheduling information to a user selection section 202. As an algorithm of this scheduling, Max C/I, Proportional Fairness, etc., is available. Furthermore, when a user signal to be transmitted is determined through the scheduling, a modulation scheme and coding rate (MCS: Modulation and Coding Scheme) are assigned to the user signal and the assigned MCS is notified to coding sections 203-1, 203-2 and modulation sections 204-1, 204-2. Furthermore, at the same time the scheduler section 201 receives a report on usable block numbers from each communication terminal apparatus and determines which of the reported blocks is used for each communication terminal apparatus and notifies it to the subcarrier mapping sections 205-1, 205-2.

The user selection section 202 temporarily stores transmission data to be sent to each communication terminal apparatus (assumed to be UE1 to UE3 in this figure as an example), selects data to be sent to the communication terminal apparatus which becomes the transmission destination according to the scheduling information output from the scheduler section 201 and outputs the data to the coding sections 203-1, 203-2.

According to this embodiment, there are two lines of system that carry out coding, modulation and subcarrier mapping, the user selection section 202 can select two pieces of transmission data and perform processing of the same contents in parallel on the respective lines. Therefore, only one line of system will be explained. In addition, one more line of system is provided as a control data processing section 207 that carries out coding, modulation and subcarrier mapping on control data. The control data processing section 207 will be explained later.

The coding section 203-1 carries out coding processing on transmission data output from the user selection section 202 using a turbo code, etc., at a coding rate notified from the scheduler section 201 and outputs the processed data to the modulation section 204-1. The modulation section 204-1 carries out modulation processing on the transmission data output from the coding section 203-1 according to the modulation scheme notified from the scheduler section 201 and outputs the modulated data to the subcarrier mapping section 205-1. The subcarrier mapping section 205-1 maps the modulated transmission data output from the modulation section 204-1 to a subcarrier determined by the scheduler section 201 and outputs the mapped data to the multiplexing section 208.

A threshold calculation section 206 calculates a CIR threshold which is a selection criterion for selecting usable blocks at the communication terminal apparatus based on information on traffic in the own cell and neighboring cells. A CIR threshold ($Th_{CIR}$) is calculated, for example, as $Th_{CIR} = S_0 - 10 \log (\gamma_0/\Sigma\gamma_i)$. At this time, $S_0$ denotes a reference CIR and is, for example, −10 dB. $\gamma_0$ denotes an amount of traffic in the own cell and $10 \log (\gamma_0/\Sigma\gamma_i)$ is a ratio (dB) of the amount of traffic in the own cell to the total amount of traffic in the own cell and 6 neighboring cells. When $S_0 = -10$ dB, $\gamma_0/\Sigma\gamma_i = 1/10$, the CIR threshold to be set is 0 dB. The threshold information calculated in this way is output to the control data processing section 207.

The control data processing section 207 carries out coding processing (coding section 207-1) on the threshold information output from the threshold calculation section 206, modulation processing (modulation section 207-2) and mapping (subcarrier mapping section 207-3) to subcarriers and outputs the processing result to the multiplexing section 208.

The multiplexing section 208 multiplexes the transmission data, control data including threshold information, a pilot line, output from the subcarrier mapping sections 205-1, 205-2, 207-3 respectively, and outputs the multiplexed data to an S/P conversion section 209. The S/P conversion section 209 converts the multiplexed signal output from the multiplexing section 208 to a plurality of lines of transmission data and outputs the lines of transmission data to an IFFT section 210. The IFFT section 210 carries out an inverse fast Fourier transform on the plurality of lines of transmission data output from the S/P conversion section 209, thereby forms an OFDM signal and outputs the OFDM signal to a GI insertion section 211. The GI insertion section 211 inserts a guard interval (GI) into the OFDM signal output from the IFFT section 210 and outputs the OFDM signal to a radio processing section 212. The radio processing section 212 carries out predetermined radio processing such as D/A conversion and up-conversion on the signal output from the GI insertion section 211 and transmits the signal subjected to the radio processing to a communication terminal apparatus through an antenna.

Figure 10:
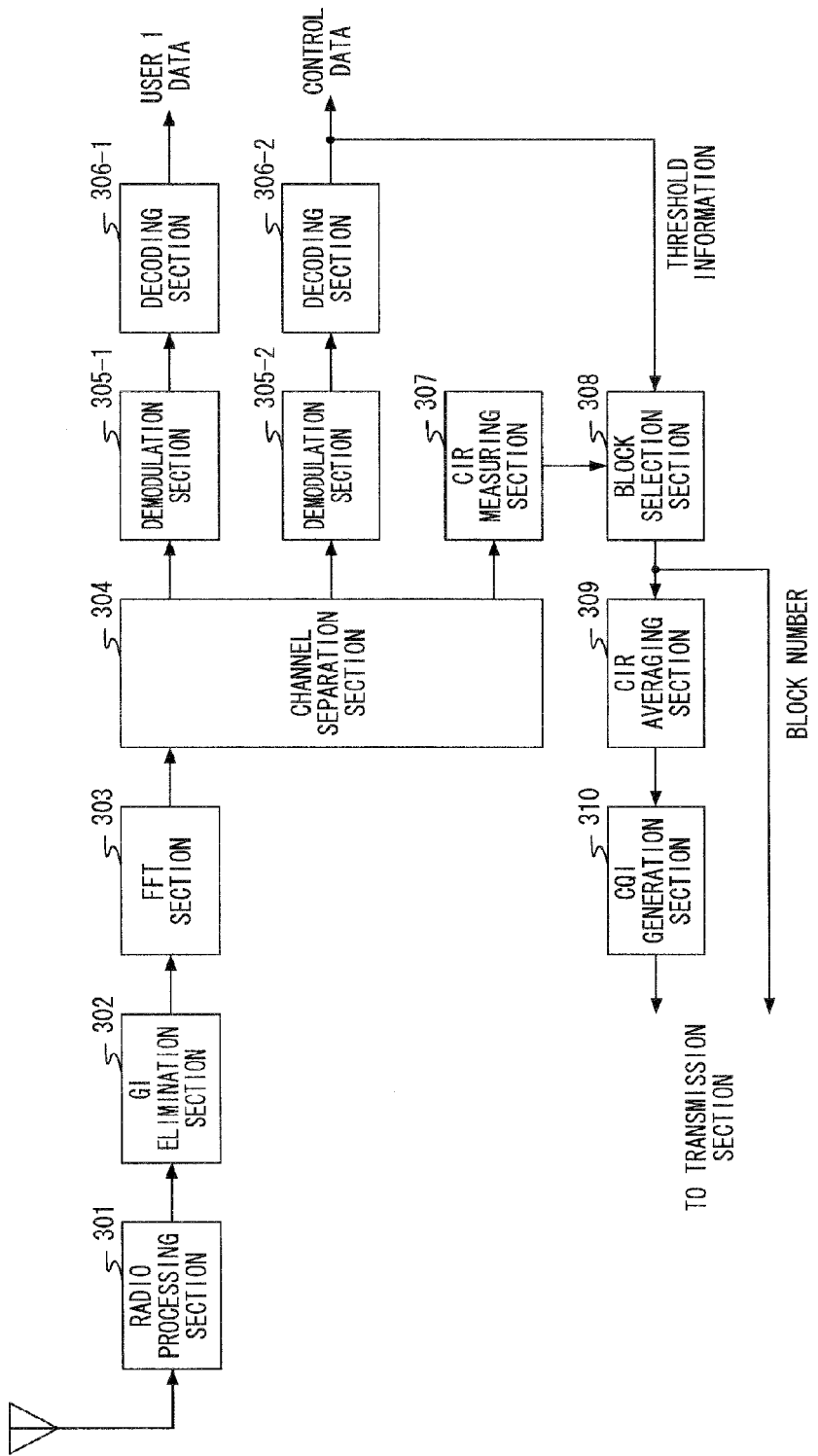
FIG. 10 is a block diagram showing the configuration of a reception system of a communication terminal apparatus according to Embodiment 1 of the present invention.

FIG. 10 is a block diagram showing the configuration of a reception system of a communication terminal apparatus according to Embodiment 1 of the present invention. In this figure, a radio processing section 301 receives the signal sent from the base station apparatus through an antenna, carries out predetermined radio processing such as down-conversion and A/D conversion on the received signal and outputs the signal after the radio processing to a GI elimination section 302. The GI elimination section 302 removes the guard interval from the signal output from the radio processing section 301 and outputs the signal deprived of the guard interval to an FFT section 303. The FFT section 303 carries out a fast Fourier transform on the signal output from the GI elimination section 302 and thereby acquires signals transmitted through the respective blocks. The acquired signals in block units are output to a channel separation section 304.

The channel separation section 304 separates the signals in block units (actually in subcarrier units) output from the FFT section 303 into user specific lines and extracts a data section, pilot section and control data section (including threshold information) directed to the own apparatus. The extracted data section is output to a demodulation section 305-1, subjected to demodulation processing by the demodulation section 305-1 and output to a decoding section 306-1. The decoding section 306-1 decodes the demodulated signal output from the demodulation section 305-1 and extracts the user data. On the other hand, the control data section extracted by the channel separation section 304 is output to a demodulation section 305-2, subjected to demodulation processing by the demodulation section 305-2 and output to a decoding section 306-2. The decoding section 306-2 decodes the demodulated signal output from the demodulation section 305-2, extracts the control data and outputs the threshold information included in the control data to a block selection section 308. Furthermore, the pilot section extracted by the channel separation section 304 is output to a CIR measuring section 307 as a reception quality measuring section, where CIRs of all subcarriers are measured. The CIR measurement result is output to the block selection section 308.

The block selection section 308 makes a decision on the CIR measurement result output from the CIR measuring section 307 against a threshold based on the threshold information output from the decoding section 306-2. That is, the block selection section 308 selects blocks equal to or greater than the threshold as usable blocks and outputs CIRs of the selected blocks to a CIR averaging section 309. Furthermore, the blocks numbers of the selected blocks are output to a transmission section (not shown).

The CIR averaging section 309 averages the CIRs of the usable blocks output from the block selection section 308 and outputs the averaged value to a CQI generation section 310.

The CQI generation section 310 includes a CQI table in which a CIR, modulation scheme (QPSK and 16 QAM, etc.), coding rate are associated with each CQI, searches for a CQI from the CQI table based on the value averaged by the CIR averaging section 309 and generates a CQI. The CQI generated is output to the transmission section (not shown). That is, a CQI corresponding to the value obtained by averaging CIRs of blocks equal to or greater than the threshold is generated.

The CQI output from the CQI generation section 310 and usable block numbers are sent to the base station apparatus through the uplink.

The operations of the above described base station apparatus and communication terminal apparatus will be explained using FIG. 11 to FIG. 14 divided into two cases; one with a large amount of traffic in the own cell and neighboring cells and the other with a small amount of traffic. First, the case with a large amount of traffic will be explained using FIG. 11 and FIG. 12.

Figure 11B:
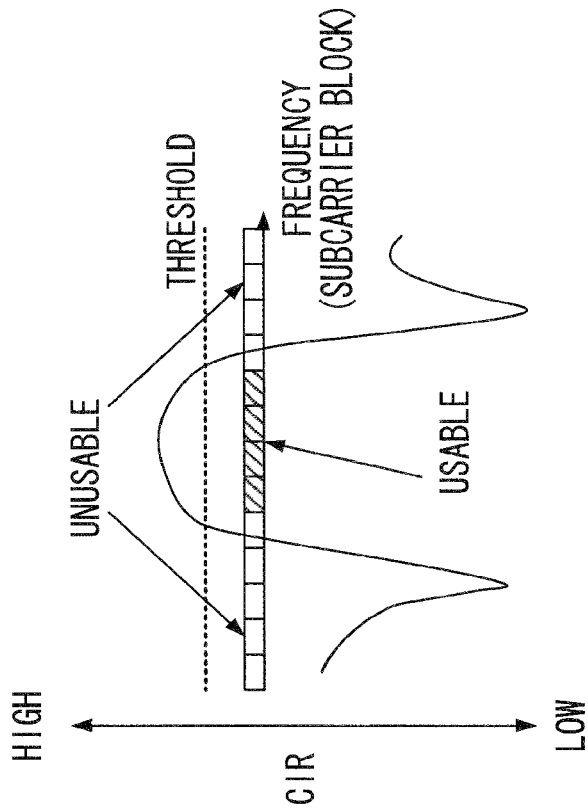
FIG. 11B illustrates a method of selecting usable blocks in Embodiment 1 of the present invention.
Figure 11A:
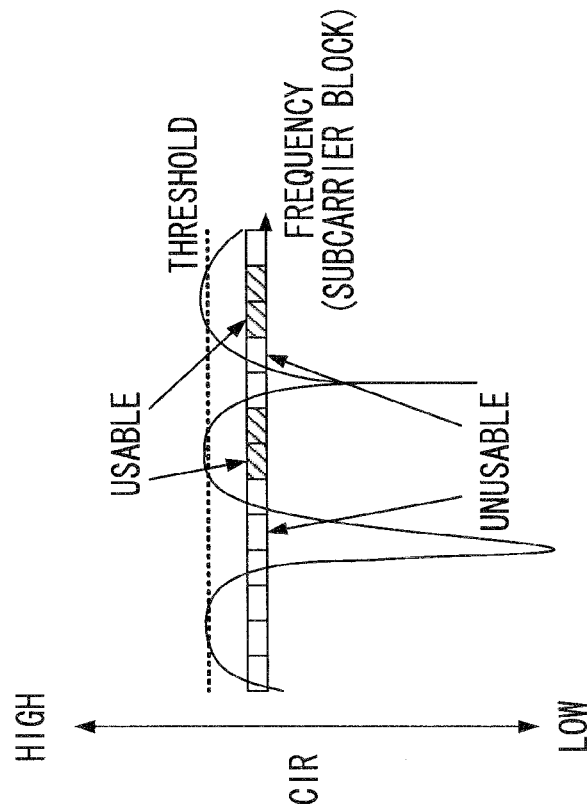
FIG. 11A illustrates a method of selecting usable blocks in Embodiment 1 of the present invention.

The block selection section 308 in the communication terminal apparatus selects blocks as shown in FIG. 11. FIG. 11 illustrates a method of selecting usable blocks according to Embodiment 1 of the present invention. Here, two situations of CIR are shown as case 1 where there is a plurality of mountains having the same CIR level (FIG. 11A) and case 2 where there is only one mountain of a high CIR (FIG. 11B). The block selection section 308 of the communication terminal apparatus makes a threshold decision based on the CIRs measured in block units and the threshold information sent from the base station apparatus. This threshold reflects the fact that there is a large amount of traffic in the own cell and neighboring cells and is set to a relatively high value. For this reason, there are relatively fewer blocks which are equal to or greater than the threshold and it is possible to reduce interference with neighboring cells.

As a result of the threshold decision by the block selection section 308, blocks whose measured CIRs are equal to or greater than the threshold are selected as usable blocks (blocks with shading in the figure), whereas blocks whose measured CIRs are smaller than the threshold (white blocks in the figure) are excluded as unusable blocks. Then, the CIRs of the blocks selected as usable blocks are output to the CIR averaging section 309 and the block numbers (information) of the selected blocks are output to the transmission section.

The CIR averaging section 309 averages the CIRs output from the block selection section 308 to a CIR per block and the CQI generation section 310 generates a CQI corresponding to the averaged CIR. The CQI generated is output to the transmission section and sent to the base station apparatus together with the block numbers output from the block selection section 308. This eliminates the necessity for reporting CQIs of all blocks equal to or greater than the threshold to the base station apparatus and can thereby reduce amount of data transmitted over the uplink.

Figure 12:
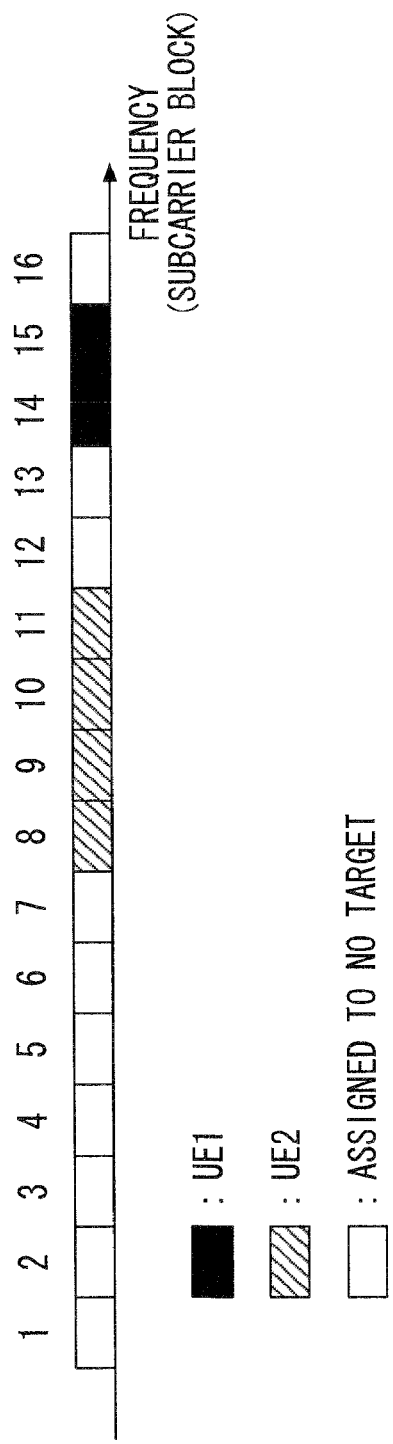
FIG. 12 illustrates an example of block assignment according to Embodiment 1 of the present invention.

At the base station apparatus, the scheduler section 201 assigns blocks based on CQIs reported from the respective communication terminal apparatuses and usable block numbers. FIG. 12 illustrates an example of block assignment according to Embodiment 1 of the present invention. Here, the number of communication terminal apparatuses to which blocks are assigned is assumed to be 2 and the communication terminal apparatuses are expressed as UE1 and UE2. As shown in FIG. 12, the base station apparatus assigns block numbers 14 and 15 to UE1 and block numbers 8 to 11 to UE2, which is assignment of a relatively small number of only blocks having good reception quality for the respective UEs.

Thus, in the case with a large amount of traffic in the own cell and neighboring cells, assigning many blocks within the own cell by reducing a threshold would cause a large amount of interference with neighboring cells, preventing the neighboring cells from using most of blocks and thereby causing the throughput of the entire system to decrease. For this reason, by increasing a threshold and reducing the number of blocks to be used in the own cell, it is possible to reduce interference with the neighboring cells. This allows the throughput of the neighboring cells to be increased. On the other hand, setting too high a threshold extremely reduces the number of usable blocks in the own cells causing the throughput in the own cell to be reduced, and therefore it is necessary to increase the number of blocks to be used in the own cell within a range which will not cause a large amount of interference with neighboring cells.

Next, the case with a small amount of traffic in the own cell and neighboring cells will be explained using FIG. 13 and FIG. 14.

Figure 13B:
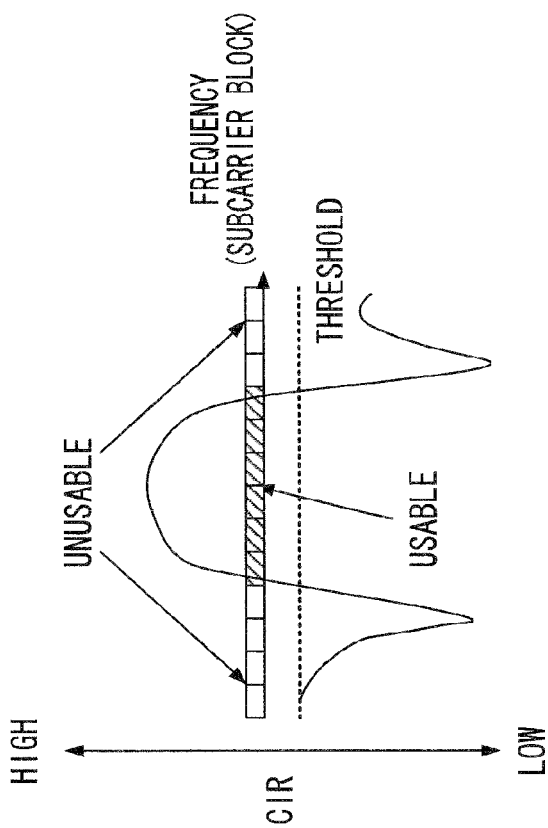
FIG. 13B illustrates a method of selecting usable blocks according to Embodiment 1 of the present invention.
Figure 13A:
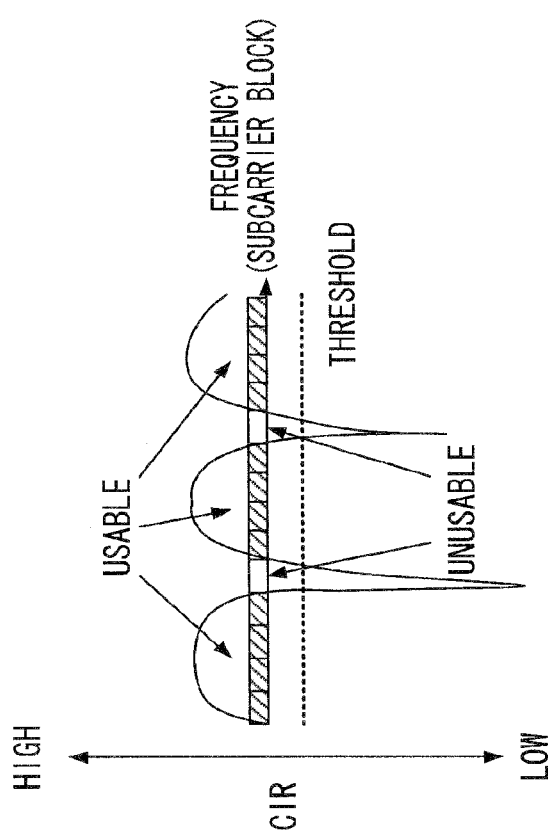
FIG. 13A illustrates a method of selecting usable blocks according to Embodiment 1 of the present invention.
Figure 14:
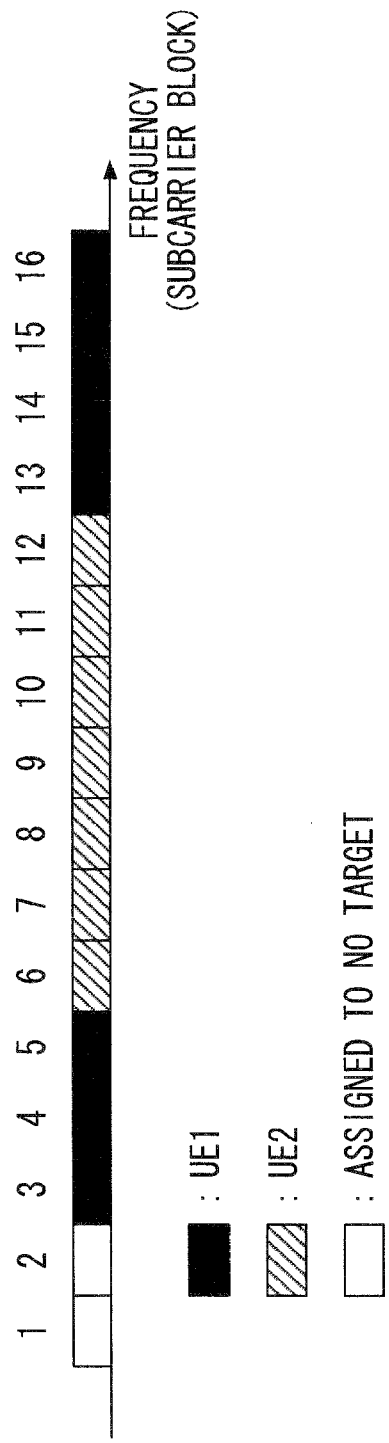
FIG. 14 illustrates a block assignment example according to Embodiment 1 of the present invention.

FIG. 13 illustrates a method of selecting usable blocks according to Embodiment 1 of the present invention. In this figure, conditions except the threshold are the same as those in FIG. 11. The threshold in the case with a small amount of traffic is set to a smaller value than in the case with a large amount of traffic. For this reason, the number of blocks exceeding the threshold is relatively large and it is possible to use more blocks, but in the case with a small amount of traffic, the channel usage rate with time in neighboring cells is low, and therefore interference with the neighboring cells is not a big problem.

In the case with a small amount of traffic just like the case with a large amount of traffic, blocks exceeding the threshold are regarded as usable blocks, CQIs are generated based on a value obtained by averaging CIRs of the usable blocks and the CQIs and usable block numbers are sent from the transmission section to the base station apparatus.

In the base station apparatus, the scheduler section 201 assigns blocks based on the CQIs and usable block numbers reported from the respective communication terminal apparatuses as in the case with a large amount of traffic. FIG. 14 illustrates an example of block assignment according to Embodiment 1 of the present invention. As shown in FIG. 14, the base station apparatus assigns block numbers 3 to 5 and 13 to 16 to UE1 and block numbers 6 to 12 to UE2, that is, the base station apparatus assigns more blocks compared to the case with a large amount of traffic.

Thus, irrespective of whether the amount of traffic is large or small, only blocks with high reception quality are used, and therefore it is possible to assign a high MCS. For example, when transmission based on QPSK using 12 blocks including blocks of low quality is compared to transmission based on 64 QAM using 6 blocks of high quality, the latter can obtain throughput 1.5 times that of the former and can also reduce interference with other cells by half.

Irrespective of whether the amount of traffic is large or small, when a plurality of communication terminal apparatuses set the same block as a usable block simultaneously, the present invention may also be adapted so that the block is assigned to communication terminal apparatuses having higher CQIs.

Furthermore, for a threshold decision made by the block selection section 308, it is also possible to use a difference obtained by subtracting an average CIR of all blocks from a CIR of each block, that is, (CIR of each block)−(average CIR). By so doing, it is possible for also the user in the center of the cell to use only blocks of relatively high quality and suppress interference with neighboring cells efficiently.

Thus, according to this embodiment, it is possible to select only blocks of high reception quality exceeding a predetermined threshold as blocks to be used, and thereby improve throughput while suppressing interference with neighboring cells out of a limited number of blocks by carrying out transmission with a high MCS. Furthermore, changing a threshold used to select usable blocks according to an amount of traffic in the own cell and neighboring cells reflects an allowable amount of interference with other cells, and can thereby realize highly efficient transmission.

Embodiment 2

Embodiment 1 has described the case where usable blocks are selected based on a threshold decision on CIRs and the threshold is controlled according to an amount of traffic in the own cell and neighboring cells. Embodiment 2 of the present invention will describe a case where usable blocks are selected within a predetermined number of blocks and the number of blocks is determined according to an amount of traffic.

Figure 15:
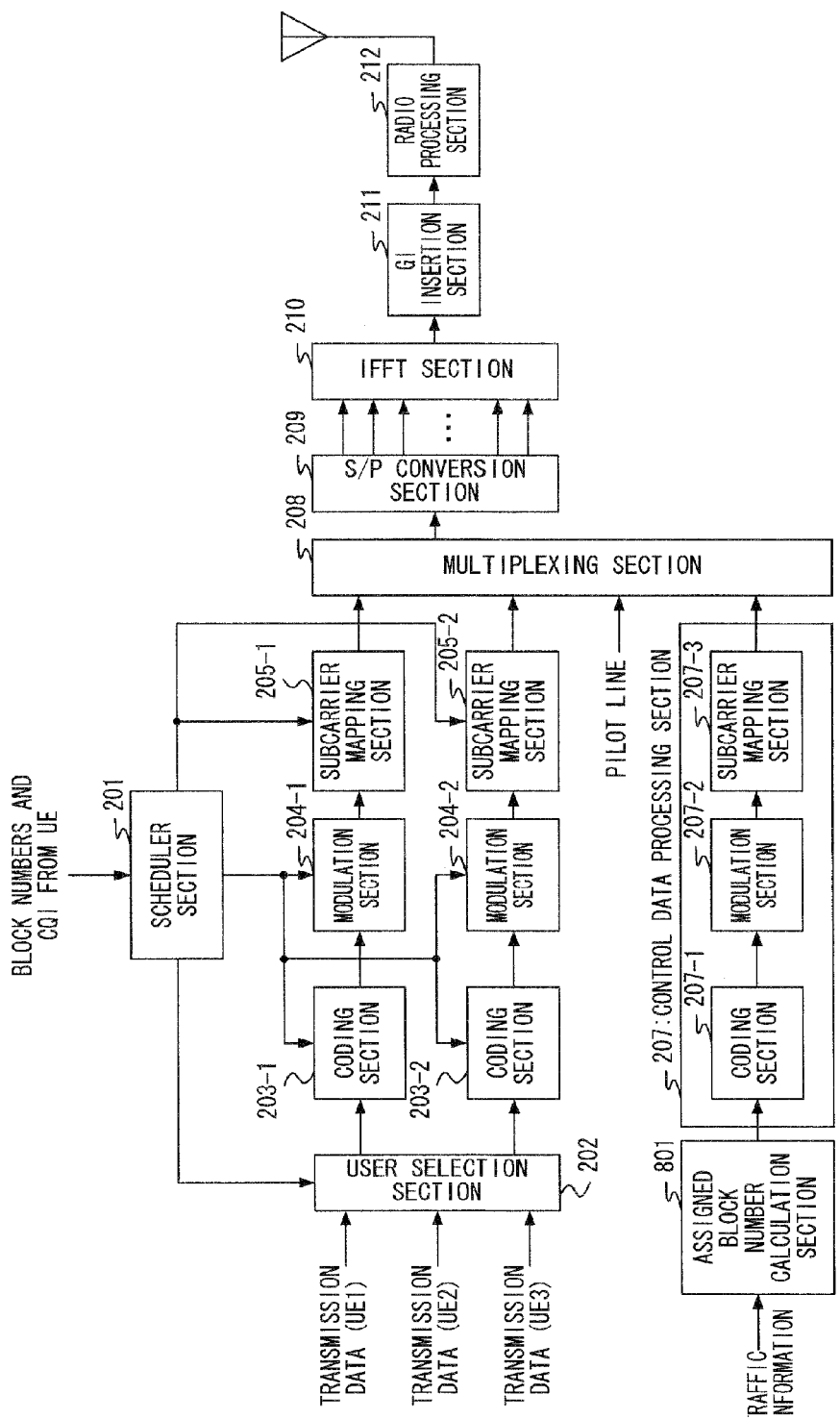
FIG. 15 is a block diagram showing the configuration of a transmission system of a base station apparatus according to Embodiment 2 of the present invention.

FIG. 15 is a block diagram showing the configuration of a transmission system of a base station apparatus according to Embodiment 2 of the present invention. However, components in FIG. 15 common to those in FIG. 9 are assigned the same reference numerals as those in FIG. 9 and detailed explanations thereof will be omitted. What FIG. 15 differs from FIG. 9 is that the threshold calculation section 206 has been changed to an assignment block number calculation section 801.

The assignment block number calculation section 801 calculates the number of blocks which is a selection criterion for selecting usable blocks in a communication terminal apparatus based on the amounts of traffic in the own cell and neighboring cells. The calculation of the number of blocks (assumed to be $N_{sb}$) can be expressed, for example, by the following expression:

$$N_{sb} = \lfloor N_{all} \times \gamma_0 / \Sigma \gamma_i \rfloor \quad (1)$$

$N_{all}$ denotes the number of blocks of all subcarriers and is, for example, 64. $\gamma_0$ denotes an amount of traffic of the own cell and $\gamma_0/\Sigma \gamma_i$ denotes the ratio of the amount of traffic in the own cell to the total amount of traffic in the own cell and 6 neighboring cells. Furthermore, the symbol in the right side denotes a maximum integer that does not exceed the number enclosed therein and is expressed, for example, as follows:

$$\lfloor 2.4 \rfloor = 2 \quad (2)$$

More specifically, when $N_{all}=64$, $\gamma_0/\Sigma \gamma_i=1/10$, $N_{sb}=6$. The information on the number of assigned blocks calculated in this way is output to the control data processing section 207.

Reducing the number of selectable blocks in the assignment block number calculation section 801 can reduce interference with neighboring cells. Causing more interference with the neighboring cells prevents most of blocks from being used and reduces the system throughput. On the other hand, reducing the number of selectable blocks excessively will cause the throughput in the own cell to reduce. Therefore, this embodiment determines the number of selectable blocks in consideration of the amount of traffic in the own cell and neighboring cells, and can thereby avoid a large amount of interference with neighboring cells and prevent the throughput of the own cell from reducing.

The configuration of the reception system of the communication terminal apparatus according to Embodiment 2 of the present invention is the same as that in FIG. 10 and only the function of the block selection section 308 is different, and therefore the reception system will be explained using FIG. 10 and detailed explanations of functional blocks common to FIG. 10 will be omitted. The decoding section 306-2 carries out decoding processing on the control data section output from the demodulation section 305-2, extracts control data and notifies the information on the number of selectable blocks included in the control data to the block selection section 308.

The block selection section 308 selects usable blocks based on CIRs measured for all blocks by the CIR measuring section 307 and the number of selectable blocks ($N_{sb}$) output from the decoding section 306-2. More specifically, the block selection section 308 selects blocks corresponding to top-ranking $N_{sb}$ CIRs as usable blocks. The CIRs of the selected usable blocks are averaged by the CIR averaging section 309, a CQI corresponding to the CIR average value is generated by the CQI generation section 310 and the CQI is output to the transmission section. The block numbers of the usable blocks selected by the block selection section 308 are output to the transmission section.

Figure 16:
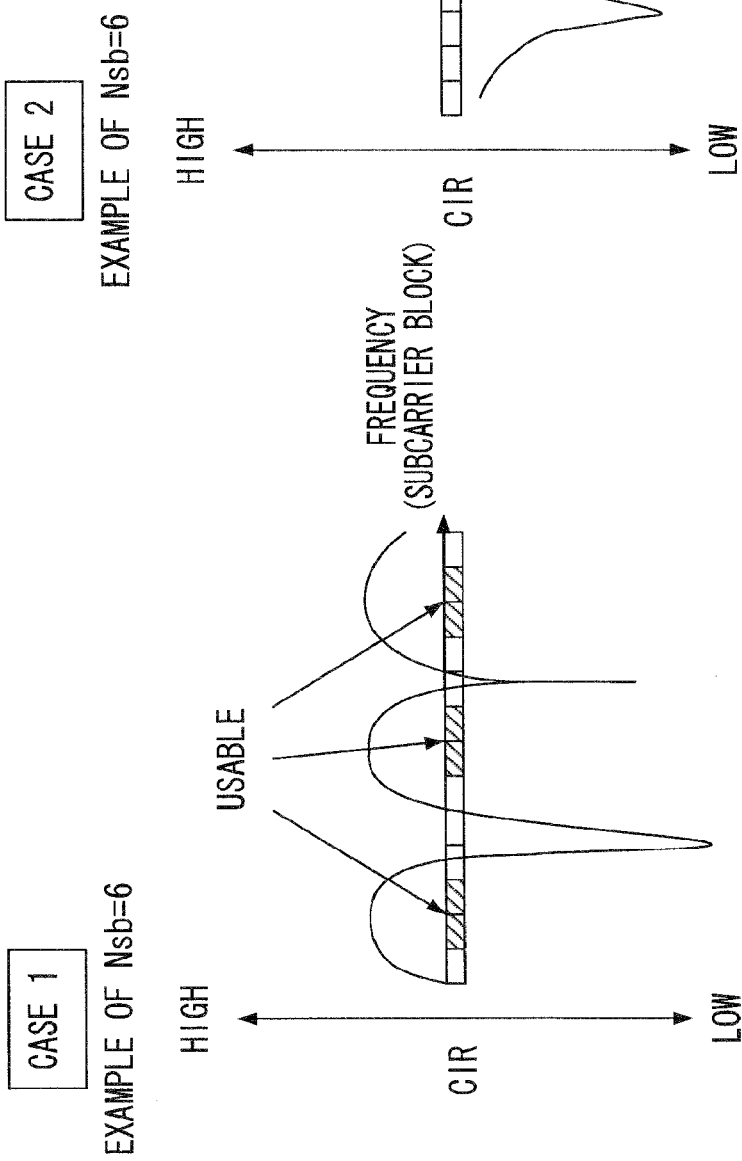
FIG. 16A illustrates a method of selecting usable blocks according to Embodiment 2 of the present invention.
FIG. 16B illustrates a method of selecting usable blocks according to Embodiment 2 of the present invention.
Figure 17:
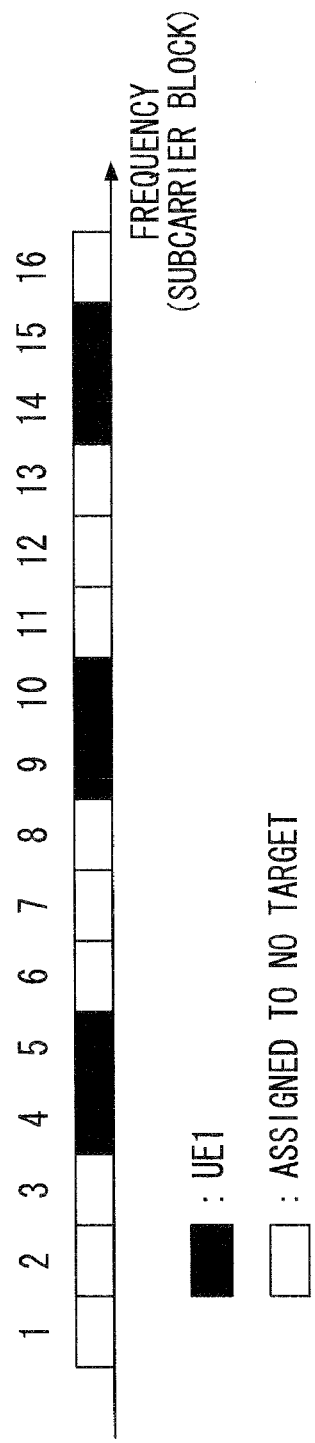
FIG. 17 illustrates a block assignment example according to Embodiment 2 of the present invention.

The operations of the above described base station apparatus and communication terminal apparatus will be explained using FIG. 16 and FIG. 17. The block selection section 308 of the communication terminal apparatus selects blocks as shown in FIG. 16. FIG. 16 illustrates a method of selecting usable blocks according to Embodiment 2 of the present invention. Here, two situations of CIR are shown as case 1 where there is a plurality of mountains having the same CIR level (FIG. 16A) and case 2 where there is only one mountain of a high CIR (FIG. 16B) assuming that the number of usable blocks ($N_{sb}$) is 6. The block selection section 308 selects usable blocks based on a CIR measured for each block and information on the number of usable blocks sent from the base station apparatus. That is, blocks corresponding to top-ranking $N_{sb}$ CIRs are selected as usable blocks and as shown in case 1 and case 2 in FIG. 16, 6 blocks are selected as specified usable blocks in both cases.

Here, blocks are selected from those having top-ranking CIRs because it is thereby possible to prevent assignment of blocks of low quality, realize highly efficient transmission and reduce interference with neighboring cells. This allows the throughput of the entire system to be improved.

Furthermore, when an MCS is assigned as in the case of this embodiment, use of blocks of higher quality makes it possible to assign a higher MCS, and thereby further improve the throughput. For example, when transmission based on QPSK using 12 blocks including blocks of low quality is compared to transmission based on 64 QAM using only 6 blocks of high quality, the latter can obtain throughput 1.5 times that of the former and also reduce interference with other cells by half.

The CIRs of the selected usable blocks are averaged by the CIR averaging section 309, a CQI corresponding to the CIR average value is generated by the CQI generation section 310 and the CQI is output to the transmission section. Furthermore, the block numbers of the usable blocks selected by the block selection section 308 are output to the transmission section.

In the base station apparatus, the scheduler section 201 assigns blocks based on the CQI and usable block numbers reported from each communication terminal apparatus. FIG. 17 illustrates an example of block assignment according to Embodiment 2 of the present invention. Here, the figure illustrates a case where the usable blocks shown in case 1 in FIG. 16 are assigned to UE1. The base station apparatus assigns block numbers 4, 5, 9, 10, 14, 15 to UE1.

Thus, this embodiment selects a predetermined number of blocks having high reception quality as blocks to be used, and can thereby improve throughput with a limited number of usable blocks through transmission at a high MCS while suppressing interference with neighboring cells. Furthermore, changing the number of usable blocks according to the amount of traffic in the own cell and neighboring cells reflects the allowable amount of interference with other cells, and can thereby carry out highly efficient transmission.

Embodiment 3

Embodiment 3 of the present invention will describe a case where blocks available to a communication terminal apparatus is predetermined according to an amount of traffic in the own cell and neighboring cells and blocks to be used are selected according to the CIR threshold explained in Embodiment 1.

Figure 18:
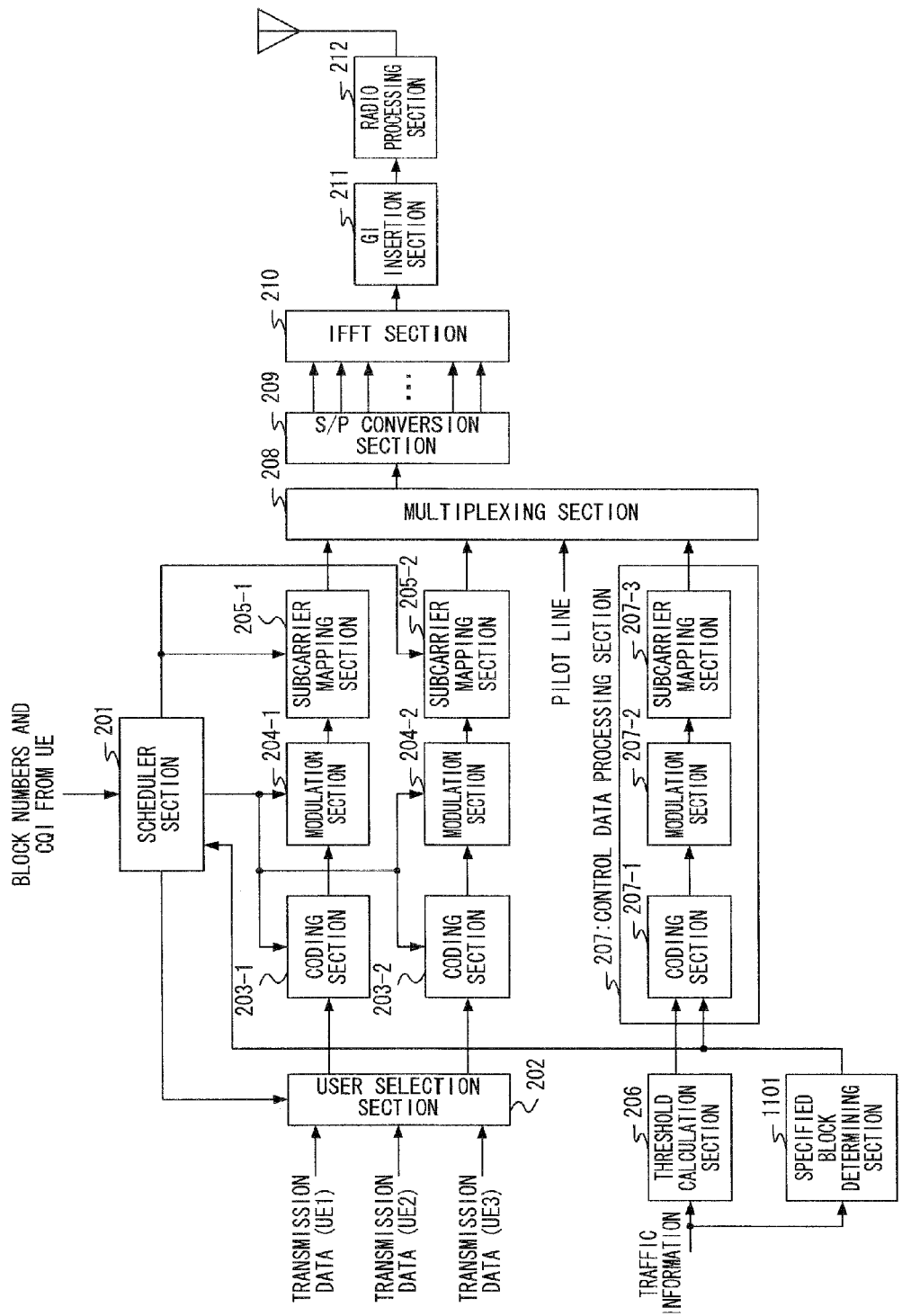
FIG. 18 is a block diagram showing the configuration of a transmission system of a base station apparatus according to Embodiment 3 of the present invention.

FIG. 18 is a block diagram showing the configuration of a transmission system of a base station apparatus according to Embodiment 3. However, the components in FIG. 18 common to those in FIG. 9 are assigned the same reference numerals as those in FIG. 9 and detailed explanations thereof will be omitted. What FIG. 18 differs from FIG. 9 is that a specified block determining section 1101 is added and the scheduler section 201 is changed to a scheduler section 1102.

The threshold calculation section 206 calculates a CIR threshold for deciding usable blocks at a communication terminal apparatus based on information on the traffic in the own cell and neighboring cells. The calculated threshold is output to the control data processing section 207.

The specified block determining section 1101 determines blocks (selectable blocks) to be specified to the communication terminal apparatus based on the amount of traffic in the own cell and neighboring cells. The information on the determined blocks to be specified (selection criterion information) is output to the scheduler section 1102 and control data processing section 207.

The scheduler section 1102 determines to which communication terminal apparatus transmission should be performed in the next frame based on a CQI reported from each communication terminal apparatus in communication, usable block numbers and specified block information output from the specified block determining section 1101 and outputs the determined scheduling information to the user selection section 202. The rest of the processing is the same as that in Embodiment 1.

Figure 19:
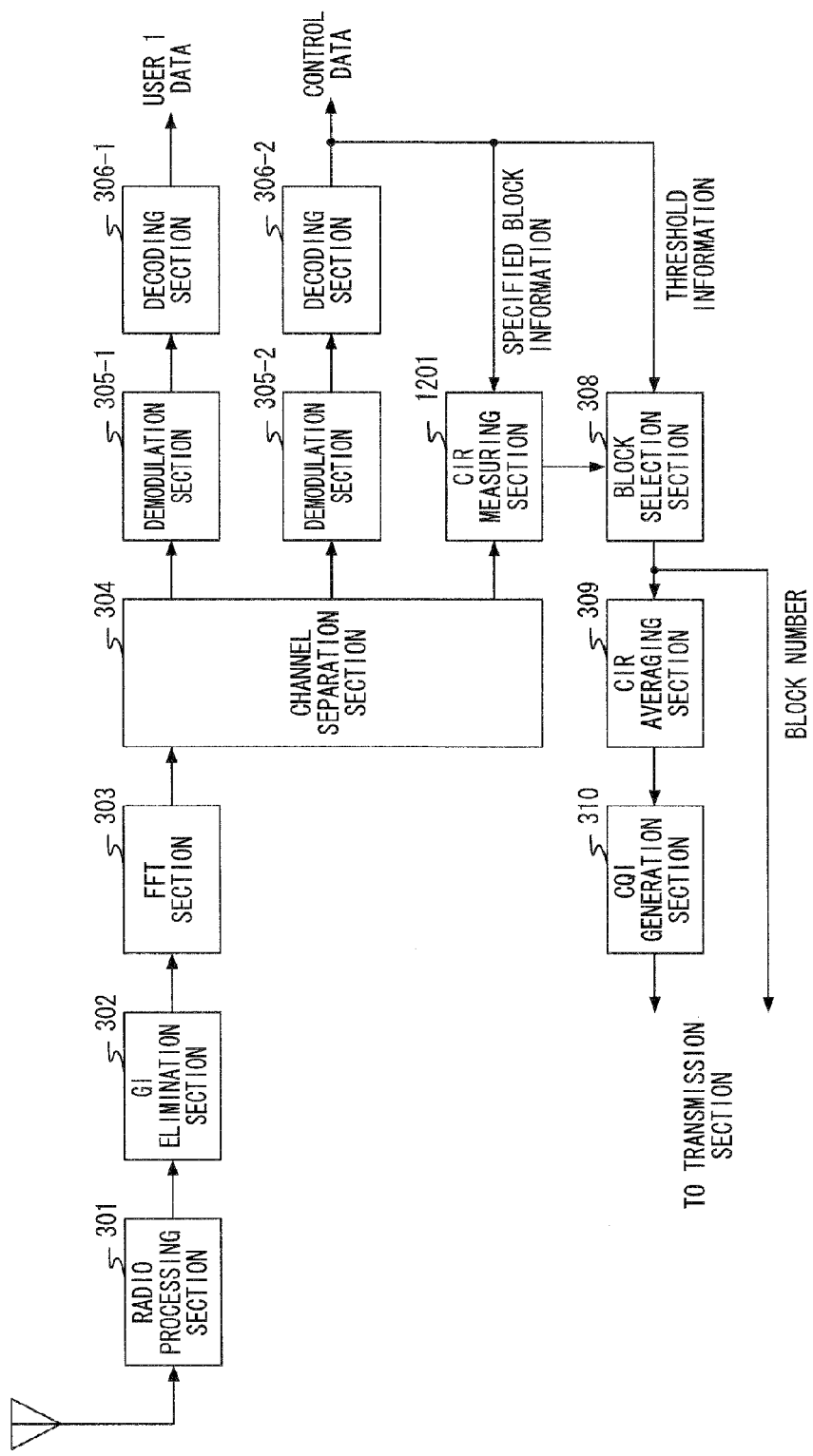
FIG. 19 is a block diagram showing the configuration of a reception system of a communication terminal apparatus according to Embodiment 3 of the present invention.

FIG. 19 is a block diagram showing the configuration of a reception system of a communication terminal apparatus according to Embodiment 3 of the present invention. However, the components in FIG. 19 common to those in FIG. 10 are assigned the same reference numerals as those in FIG. 10 and detailed explanations thereof will be omitted. What FIG. 19 differs from FIG. 10 is that the CIR measuring section 307 is changed to a CIR measuring section 1201.

The decoding section 306-2 carries out decoding processing on the control data section output from the demodulation section 305-2, extracts control data, outputs the information on specified blocks included in the control data to the CIR measuring section 1201 and outputs the threshold information also included in the control data to the block selection section 308.

The CIR measuring section 1201 carries out CIR measurement on only the blocks specified by the pilot sections of the blocks indicated by the information on the blocks to be specified output from the decoding section 306-2 out of the pilot sections output from the channel separation section 304. Here, the CIR measuring section 1201 carries out CIR measurement on only the blocks specified by the base station apparatus, and therefore compared to the case where CIR measurement is performed on all blocks, it is possible to reduce an amount of processing required for CIR measurement and at the same time shorten the time required for processing. The measured CIR is output to the block selection section 308.

The block selection section 308 makes a threshold decision on the CIR measurement result output from the CIR measuring section 1201 based on the threshold information output from the decoding section 306-2. The block selection section 308 needs to make a threshold decision on the CIR measurement result output from the CIR measuring section 1201 for only blocks specified by the base station apparatus instead of all blocks, and can thereby reduce the amount of processing and reduce the time required for processing. As a result of the threshold decision, blocks equal to or greater than the threshold are regarded as usable blocks and CIRs of these blocks are output to the CIR averaging section 309 and these block numbers are output to a transmission section (not shown).

Figure 20A:
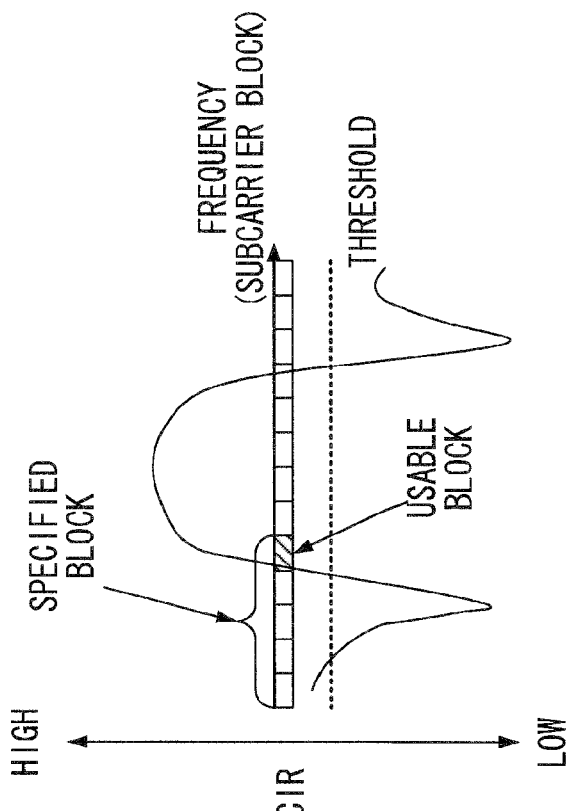
FIG. 20A illustrates a method of selecting usable blocks according to Embodiment 3 of the present invention.
Figure 20B:
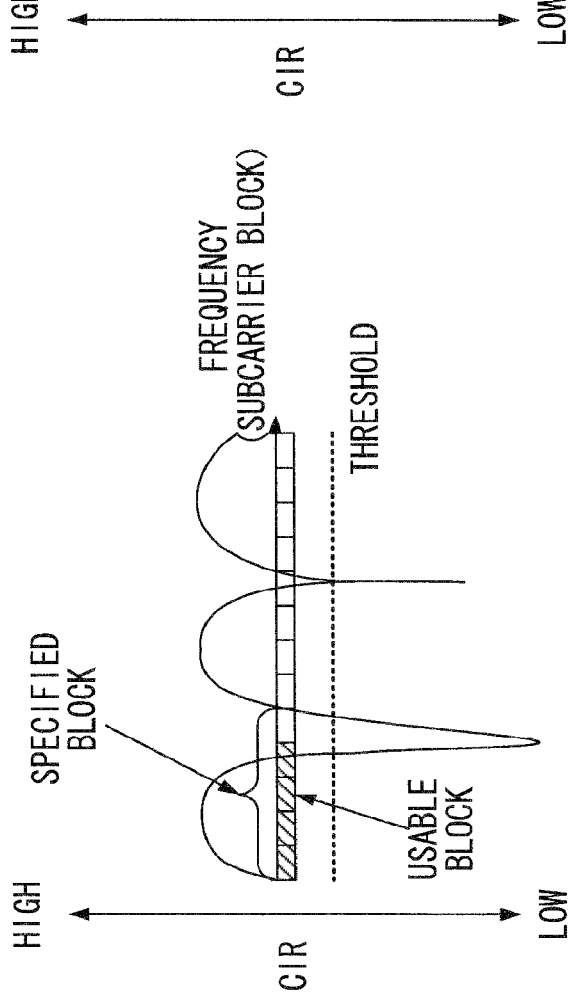
FIG. 20B illustrates a method of selecting usable blocks according to Embodiment 3 of the present invention.

The operations of the above described base station apparatus and communication terminal apparatus will be explained using FIG. 20. FIG. 20 illustrates a method of selecting usable blocks in Embodiment 3 of the present invention. Here, two situations of CIR are shown as case 1 where there is a plurality of mountains having the same CIR level (FIG. 20A) and case 2 where there is only one mountain of a high CIR (FIG. 20B). The block selection section 308 of the communication terminal apparatus makes a threshold decision on CIRs measured about the blocks specified by the base station apparatus based on the threshold information sent from the base station apparatus. In case 1 in FIG. 20A, the blocks specified from the base station apparatus are five blocks from the left, but the blocks exceeding the threshold are up to the fourth block from the left. Furthermore, in case 2 in FIG. 20B, the block specified from the base station apparatus are five blocks from the left, but only the fifth block from the left is the block that exceeds the threshold. In this way, the usable blocks selected by the communication terminal apparatus are limited to blocks specified beforehand, and therefore it is possible to reduce an amount of data of block numbers when the usable block numbers are reported to the base station apparatus.

Thus, according to this embodiment, the base station apparatus specifies blocks to be assigned to the communication terminal apparatus beforehand according to the amount of traffic in the own cell and neighboring cells, and can thereby reduce an amount of processing and processing time required to select usable blocks at the communication terminal apparatus and also reduce an amount of information on block numbers used to be reported to the base station apparatus.

The blocks specified by the base station apparatus may also be changed according to a predetermined pattern instead of being calculated and notified every time.

Furthermore, this embodiment has explained the case where blocks to be assigned to a communication terminal apparatus are restricted and then applied to Embodiment 1, but blocks may also be applied to Embodiment 2. When applied to Embodiment 2, blocks corresponding to top-ranking $N_{sb}$ CIRs are selected as usable blocks.

The above described embodiments have explained the case where an MCS is assigned, but the present invention is also applicable to cases where no MCS is assigned.

Furthermore, in the respective embodiments, the base station apparatus calculates a threshold, calculates the number of blocks assigned and determines blocks to be specified, but a higher-level control apparatus can also perform these calculation and determination. These calculation and determination are performed based on traffic information, but may also be performed based on the number of users.

Furthermore, the respective embodiments assume that the number of subcarriers used is 512 and one block consists of 32 subcarriers, but the present invention is not limited to this and the number of subcarriers may also be set arbitrarily.

As explained above, according to the present invention, subcarriers of high reception quality are selected as subcarriers to be used based on a criterion notified from the other party of communication, report values indicating average channel quality of the selected subcarriers are created, the report values created and information indicating the subcarriers to be used are reported to the other party of communication, and it is thereby possible to allow the other party of communication to carry out transmission using only subcarriers of high quality and thereby improve the throughput in the own cell and neighboring cells and improve the throughput of the entire system consequently. Furthermore, averaging and reporting the channel quality of the subcarriers to be used can reduce an amount of data required for reporting.

This application is based on the Japanese Patent Application No. 2002-378076 filed on Dec. 26, 2002, entire content of which is expressly incorporated by reference herein.

INDUSTRIAL APPLICABILITY

The present invention is suitable for use in a radio communication apparatus and radio communication method in multicarrier transmission.

The invention claimed is:

1. A base station for transmitting an orthogonal frequency division multiplexing (OFDM) signal, the base station comprising:
a transmitting section configured to transmit information of a number to a mobile device, the information of the number corresponding to subcarrier blocks to be used for averaging channel quality, each of the subcarrier blocks including a plurality of subcarriers, wherein the information of the number does not indicate positions of subcarrier blocks to be selected; and
a receiving section configured to receive a signal from the mobile device, the signal including a generated CQI and information indicating positions of selected subcarrier blocks selected by the mobile device, the generated CQI being a value representing an average channel quality across only the selected subcarrier blocks which are corresponding to the information of the number and are providing preferred channel quality, within a communication band used for transmission from the base station to the mobile device, wherein said number is less than the total number of subcarrier blocks within the communication band.

2. The base station according to claim 1, wherein said number corresponding to subcarrier blocks to be used for averaging channel quality is determined correspondingly to the total number of subcarrier blocks within the communication band and an amount of traffic.

3. The base station according to claim 2, wherein said number corresponding to subcarrier blocks to be used for averaging channel quality is determined according to the following equation:

$$N_{sb} = \lfloor N_{all} \times \gamma_0 / \Sigma \gamma_i \rfloor$$

wherein $N_{all}$ denotes the total number of subcarrier blocks within the communication band, $\gamma_0$ denotes an amount of traffic in a cell that includes the mobile device, and $\gamma_0/\Sigma\gamma_i$ denotes a ratio of the amount of traffic in said cell to a total amount of traffic in said cell and neighboring cells.

4. A radio communication method to be carried out by a base station for transmitting an orthogonal frequency division multiplexing (OFDM) signal, the radio communication method comprising:
transmitting, by said base station, information of a number to a mobile device, the information of the number corresponding to subcarrier blocks to be used for averaging channel quality, each of the subcarrier blocks including a plurality of subcarriers, wherein information of the number does not indicate positions of the subcarrier blocks to be selected; and
receiving a signal from the mobile device, the signal including a generated CQI and information indicating positions of selected subcarrier blocks selected by the mobile device, the generated CQI being a value representing an average channel quality across only the selected subcarrier blocks which are corresponding to the information of the number and are providing preferred channel quality, within a communication band used for transmission from the base station to the mobile device, wherein said number is less than the total number of subcarrier blocks within the communication band.

5. The radio communication method according to claim 4, wherein said number corresponding to subcarrier blocks to be used for averaging channel quality is determined correspondingly to the total number of subcarrier blocks within the communication band and an amount of traffic.

6. The radio communication method according to claim 5, wherein said number corresponding to subcarrier blocks to be used for averaging channel quality is determined according to the following equation:

$$N_{sb} = \lfloor N_{all} \times \gamma_0 / \Sigma \gamma_i \rfloor$$

wherein $N_{all}$ denotes the total number of subcarrier blocks within the communication band, $\gamma_0$ denotes an amount of traffic in a cell that includes the mobile device, and $\gamma_0/\Sigma\gamma_i$ denotes a ratio of the amount of traffic in said cell to a total amount of traffic in said cell and neighboring cells.

* * * * *